US008513324B2

(12) United States Patent
Scales et al.

(10) Patent No.: US 8,513,324 B2
(45) Date of Patent: Aug. 20, 2013

(54) POLYMERIC ARTICLES COMPRISING OXYGEN PERMEABILITY ENHANCING PARTICLES

(71) Applicant: Johnson & Johnson Vision Care, Inc., Jacksonville, FL (US)

(72) Inventors: Charles W. Scales, St. Augustine, FL (US); Gregory A. Hill, Atlantic Beach, FL (US); John B. Enns, Jacksonville, FL (US); Eric R. George, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 13/737,364

(22) Filed: Jan. 9, 2013

(65) Prior Publication Data

US 2013/0131214 A1 May 23, 2013

Related U.S. Application Data

(62) Division of application No. 12/721,081, filed on Mar. 10, 2010.

(60) Provisional application No. 61/164,931, filed on Mar. 31, 2009, provisional application No. 61/252,279, filed on Oct. 16, 2009.

(51) Int. Cl.
*G02B 1/04* (2006.01)
*C08K 3/18* (2006.01)

(52) U.S. Cl.
USPC ........... 523/106; 523/105; 523/107; 523/108; 523/200; 523/210; 524/413

(58) Field of Classification Search
USPC .............. 523/105, 106, 107, 108, 200, 210; 524/413
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 4,113,224 A | 9/1978 | Clark et al. | |
| 4,197,266 A | 4/1980 | Clark et al. | |
| 4,680,336 A | 7/1987 | Larsen | |
| 4,701,038 A | 10/1987 | Neefe | |
| 4,701,288 A | 10/1987 | Cook | |
| 4,889,664 A | 12/1989 | Kindt-Larsen | |
| 4,900,764 A * | 2/1990 | Highgate et al. | 523/106 |
| 5,039,459 A | 8/1991 | Kindt-Larsen | |
| 5,457,140 A | 10/1995 | Nunez | |
| 5,490,960 A | 2/1996 | Nunez | |
| 5,498,379 A | 3/1996 | Nunez | |
| 5,594,043 A | 1/1997 | Nunez | |
| 5,661,215 A | 8/1997 | Gee | |
| 5,684,058 A | 11/1997 | Nunez | |
| 5,736,409 A | 4/1998 | Nunez | |
| 5,910,519 A | 6/1999 | Nunez | |
| 6,316,541 B1 | 11/2001 | Gee | |
| 6,638,994 B2 | 10/2003 | Crooks | |
| 7,723,438 B2 | 5/2010 | Hedrick | |
| 8,344,042 B2 * | 1/2013 | Liu et al. | 523/115 |
| 2004/0120982 A1 | 6/2004 | Diana | |
| 2005/0255231 A1 | 11/2005 | Hill | |
| 2006/0063852 A1 | 3/2006 | Iwata | |
| 2008/0275171 A1 * | 11/2008 | Song et al. | 524/417 |
| 2010/0249273 A1 | 9/2010 | Scales | |

FOREIGN PATENT DOCUMENTS

| | | |
|---|---|---|
| CN | 101163991 A | 4/2008 |
| EP | 1054269 A2 | 11/2000 |
| GB | 2221688 A | 2/1990 |
| WO | WO 9710527 A1 | 3/1997 |
| WO | WO 9821311 A1 | 5/1998 |
| WO | WO 2006026474 A2 | 3/2006 |
| WO | WO 2007005249 A2 | 1/2007 |

OTHER PUBLICATIONS

"Carbon Nanoballoon Produced by Thermal Treatment of Arc Soot", New diamond and Frontier Carbon Technology, 15 No. 2 (2005). Toyohashi University of Technology Japan.
"Graphene: A Perfect Nanoballoon", Leenaerts et al., Applied Physics Letters, 93, 193107 (2008).
Chemistry Dept. Univ. Arizona; "Nanoparticles and nanoballoons of amorphous boron coated with crystalline boron nitride", Appl. Phys. Lett. 79, 188 (2001).
Dept Physics, Univ. Antwerpen; "Growing Nanoballoons and Nanotubes of Pure polymer from a Microcapsule", Fei et al., Inst. Textiles, Macromol. Rapid Commun. 29 1882-1886, (2008).
Dukes, Douglas. "Conformational Transitions of Spherical Polymer Brushes: Synthesis, Characterization, and Theory," *Macromalecules*, 43 (2010): 1564-1570. Print.
Fabrication of Core-Shell $Fe_3O_4$/polypyrole and Hollow Polypyrole Microspheres, Polymer Composites 2009. Lu et al., Jilin University, China.
Georgia Tech.; "Stable Polymeric Nanoballoons: Lyphilization and Rehydration of Cross-linked Liposomes", Liu and O'Brian, J. Am. Chemical Society, 124 6037-6042, (2002).
Jagiellonian Univ. Krakow Poland; "Encapsulation of Inorganic Particles with Nanostructured Cellulose", Nelson and Deng, Macromol. Mater. Eng., 292 1158-1163, (2007).
Journal of Biotechnology 77 (2000) 151-156 "Evaluation of oxygen permeability of gas vesicles from cyanobacterium Anabaena flosaquae".
Landfester, Katherina. "Preparation of Polymer Particles in nonaqueous Direct and inverse Miniemulsions." *Macromolecules*. 33 (2000): 2370-2376. Print.
Lin, Mingtao. "Silicone-polyacrylate composite latex particles. Particles formation and film properties." *Polymer* 46 (2005): 1331-1337. Print.

(Continued)

*Primary Examiner* — Vickey Nerangis
(74) *Attorney, Agent, or Firm* — Karen A. Harding

(57) ABSTRACT

The present invention relates to a composition comprising a hydrogel polymer having less than 100% haze, and distributed therein an oxygen enhancing effective amount of oxygen permeable particles having an oxygen permeability of at least about 100 barrer, average particle size less than about 5000 nm.

30 Claims, 7 Drawing Sheets

(56) References Cited

OTHER PUBLICATIONS

Macromol. Mat. Eng. 2007 292, 1158-1163 "Encapsulation of Inorganic Particles with Nanostructured Cellulose".

Nagai, Kazukiyo, et al. "Poly[1-(trimethylsilyl)-1-propyne] and related polymers: synthesis, properties and functions." *Prog. Polym. Sci.*. 26. (2001): 721-798.

Nature vol. 367 Jan. 20, 1994.

Okubo, Tsuyoshi. "Synthesis, Hydrophilicity, and Oxygen Permeability of Poly [(trimethylsilyl)propyne]-gr-poly (N,N-dimethylacrylamide)."*Journal of Polymer Science: Part A: Polymer Chemistry*. 36. (1998): 603-610.

*Polymer Handbook, 4th Edition* by J. Brandrup, Immergut, E.H., Grulke, E. A., Bloch, D.

Racles, Carmen. "On the feasibility of chemical reactions inthe presence of siloxane-based surfactants." *Colloid Polymer Science*. 287 (2009): 461-470. Print.

The Hong Kong Polytechnic University; "Silicone Nanocapsules Templated Inside the Membranes of Cationic Vesicles", Kepczynski et al., Langmuir, 23 7314-7320, (2007).

Volume III, Photoinitiators for Free Radical Cationic & Anionic Photopolymerization, $2^{nd}$ Edition by J.V. Crivello & K. Dietliker; edited by G. Bradley; John Wiley and Sons; New York; 1998.

* cited by examiner

US 8,513,324 B2

POLYMERIC ARTICLES COMPRISING OXYGEN PERMEABILITY ENHANCING PARTICLES

RELATED APPLICATIONS

This application is a division of application Ser. No. 10/383,369 filed Mar. 7, 2003 and claims priority of U.S. Provisional Patent Application No. 61/164,931 filed Mar. 31, 2009 and U.S. Provisional Patent Application No. 61/252,279 filed Oct. 16, 2009.

FIELD OF THE INVENTION

The invention relates to polymeric articles comprising oxygen permeability enhancing particles and processes for forming such articles.

BACKGROUND OF THE INVENTION

Polymeric materials displaying oxygen permeability are desirable for a number of applications, including medical devices. One such application is contact lenses.

Gas permeable soft contact lenses ("GPSCL") have been made from conventional and silicone hydrogels. Conventional hydrogels have been prepared from monomeric mixtures predominantly containing hydrophilic monomers, such as 2-hydroxyethyl methacrylate ("HEMA"), N-vinyl pyrrolidone ("NVP") and vinyl alcohol. The oxygen permeability of these conventional hydrogel materials relates to the water content of the materials, and is typically below about 20-30 barrers. For contact lenses made of the conventional hydrogel materials, that level of oxygen permeability is suitable for short-term wear of the contact lenses; however, that level of oxygen permeability may be insufficient to maintain a healthy cornea during long-term wear of contact lenses (e.g., 30 days without removal).

Silicone hydrogels (SiH's) are also currently used as materials in GPSCLs. Silicone hydrogels have typically been prepared by polymerizing mixtures containing at least one silicone-containing monomer or reactive macromer and at least one hydrophilic monomer. While this class of lens material reduces the corneal edema and hyper-vasculature associated with conventional hydrogel lenses, they can be difficult to produce because the silicone components and the hydrophilic components are incompatible. Additional material improvements to protein uptake profiles, wettability and general comfort on the eye over extended periods of time are also desirable.

Silicone elastomer contact lenses have also been made. These lenses displayed good oxygen permeability, but had poor wettability and mechanical properties. Reinforced silica filler has been disclosed as improving the physical properties of the silicone elastomers.

SUMMARY OF THE INVENTION

The present invention relates to a composition comprising a polymer having distributed therein an oxygen enhancing effective amount of oxygen permeable particles having an oxygen permeability of at least about 100 barrer and an average particle size less than about 5000 nm.

DETAILED DESCRIPTION OF THE INVENTION AND PREFERRED EMBODIMENTS

Figure 1:
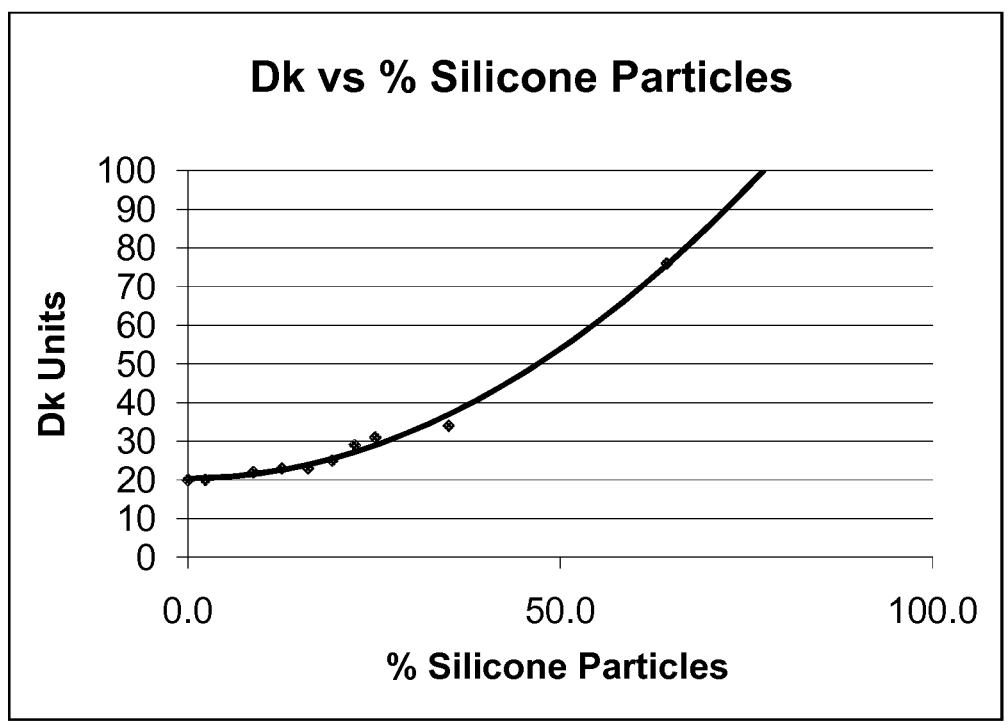
FIG. 1 is a graph of Dk vs. concentration of silicon microparticles in the polymer.

As used herein, a "medical device" is any article that is designed to be used while either in or on mammalian tissues or fluid. Examples of these devices include but are not limited to catheters, implants, stents, and ophthalmic devices such as intraocular lenses and contact lenses. The preferred biomedical devices are ophthalmic devices, particularly contact lenses, most particularly contact lenses made from hydrogels.

As used herein, the term "lens" refers to ophthalmic devices that reside in or on the eye. These devices can provide optical correction, cosmetic enhancement, radiation reduction, including UV blocking and visible light or glare reduction, therapeutic effect, including wound healing, delivery of drugs or nutraceuticals, diagnostic evaluation or monitoring, or any combination thereof. The term lens includes, but is not limited to, soft contact lenses, hard contact lenses, intraocular lenses, overlay lenses, ocular inserts, and optical inserts.

A "reaction mixture" is the mixture of components, including, reactive components, diluent (if used), initiators, crosslinkers and additives, which when subjected to polymer forming conditions form a polymer.

Reactive components are the components in the reaction mixture, which upon polymerization, become a permanent part of the polymer, either via chemical bonding, entrapment or entanglement within the polymer matrix. For example, reactive monomers become part of the polymer via polymerization, while non-reactive polymeric internal wetting agents, such as PVP, and the oxygen permeable particles of the present invention, became part of the polymer via physical entrapment. The diluent (if used) and any additional processing aids, such as deblocking agents do not become part of the structure of the polymer and are not part of the reactive components. The reaction mixtures of the present invention can be formed by any of the methods known by those skilled in the art to be useful to form polymeric articles or devices, and include stirring, rolling, kneading and shaking.

As used herein "biocompatibility" and "biocompatible" means that the material in question does not cause any substantial negative response when in contact with the desired biological system. For example when the oxygen permeable particles are incorporated into contact lenses the undesirable negative responses include stinging, inflammation, undesirable levels of protein and lipid uptake, ocular cell damage and other immunological responses.

A "hydrogel" polymer is a polymer capable of absorbing or imbibing at least about 20 weight % water, in some embodiments at least about 30 weight % water and in other embodiments at least about 40 weight % water.

Oxygen permeable particles have an oxygen permeability of at least about 100 barrer, in some embodiments between about 100 and about 1000 barrer, and in other embodiments between about 300 and about 1000 barrers. The oxygen permeable particles may also have oxygen permeabilities of at least about 300, 400 or 500 barrers. The oxygen permeable particles of the present invention may be solid, or "filled" or may be hollow. Solid oxygen permeable particles may be formed from crosslinked polymers, for example, fluorine containing polymers, polydialkylsiloxane polymers, self-assembled siloxanes and rigid materials such as polytrimethylsilylpropyne and combinations thereof.

In one embodiment the oxygen permeable particles are non-reactive means that under the conditions of formation and use of the compositions of the present invention, the oxygen permeable particles do not covalently bond to the polymer but may associate with the polymer via dipole-dipole forces such as hydrogen bond or van der Waals forces. If the oxygen permeable particles are encapsulated, either the oxygen permeable particles do not covalently bond to the encapsulating material, the encapsulating material does not bond to the polymer or both. In one embodiment the oxygen permeable particles are surface reactive to assist in dispersing and/or stabilizing the oxygen permeable particles in the selected reaction mixtures.

Potentially anionic or cationic means that the molecule has latent ionicity. An example of a potentially anionic group is a carboxylate, and an example of a potentially cationic group is an amine, and particularly a tertiary amine.

The oxygen permeable particles are selected so that they do not substantially degrade the optical properties of the polymer, including color and clarity. This may be accomplished by controlling the particle size, refractive index, chemical properties of the oxygen permeable particles or any combination of the foregoing. The oxygen permeable particles have a refractive index of within about 20% hydrated polymer matrix and in some embodiments within about 10% of the refractive index of the hydrated polymer matrix. Other embodiments may employ oxygen permeable particles with a refractive index within about 1% of the hydrated polymer matrix and in other embodiments still, less than 0.5%. In one embodiment, the oxygen permeable particles have an average particle size between about 200 and about 1000 nm and a refractive index within about 10% of the refractive index of the hydrated polymer matrix. Oxygen permeable particles with a particle size of less than 200 nm, may have refractive indices which are within about 20% of the refractive index of said hydrated polymer matrix. In one embodiment, where the polymer is a hydrogel suitable for making contact lenses, the refractive index of the oxygen permeable particle is between about 1.37 and about 1.45. In one embodiment the refractive index of the hydrogel polymer is between about 1.39 and about 1.43 and the encapsulated oxygen permeable particles have a refractive index within the ranges specified above.

In one embodiment, the oxygen permeable particles are incorporated into the ophthalmic devices, and in one embodiment contact lenses in at least one region outside the optic zone. The optic zone is the region through which light is focused. In this embodiment larger particle sizes can be tolerated without refractive index matching. Thus, contact lenses made according to this embodiment may have average particle sizes of between about 200 nm and 100 microns.

Solid Oxygen Permeable Particles

Solid oxygen permeable particles may be formed from materials including cross-linked polymers containing silicones, fluorine, and combinations thereof, oxygen permeable perovskite oxides, combinations thereof and the like. Specific examples of silicone containing polymers include polydimethylsiloxane (PDMS), cross-linked poly(dimethylsiloxane), poly((trimethyl silyl)propyne) and cross-linked poly(dimethylsiloxane) core and a polydimethylsiloxane/and a poly(silsesquioxane) (PDMS/POSS) core/shell shell available from Shin Etsu, Inc. (Japan) under the name X-52-7030, and having an average size distribution of 800 nm with a range from 0.2-2000 nm. Examples of fluorine containing polymers include amorphous fluoropolymers such as 2,2-bis(trifluoromethyl)-4,5-difluoro-1,3-dioxole copolymers with tetrafluoroethylene (sold under the tradename TEFLON AF), fluorinated PDMS, and fluorinated polynorbornene. Copolymers and mixtures containing the foregoing may also be used, so long as the oxygen permeable particles have oxygen permeabilities in the ranges disclosed herein. In one embodiment, the solid oxygen permeable particle comprises at least one inorganic material, such as metalloids such as boron nitrides, metal oxides, including iron oxide, aluminum oxide, titanium dioxide, zirconium oxide, metals, such as gold, transition metal sulfides, such as ZnS and CdS, graphene, inorganic/organic hybrids such as whole shell metal oxides coated with cellulose, Copolymers containing the foregoing and mixtures of any of the foregoing with any of the inorganic materials may also be used.

Suitable solid oxygen permeable particles have an average particle size less than 5000 nm, in some embodiments less than about 1000 nm, in some embodiments less than about 800 nm, in other embodiments less than about 600 nm and in other embodiments still, less than about 200 nm.

Hollow Nanoparticles

Alternatively, the oxygen permeable particles may be hollow. Suitable hollow nanostructures have a rigid shell which is impermeable to water and which encapsulates or encloses a gas-filled space. Hollow nanostructures are permeable to gases such as oxygen and air, and have an oxygen permeability of at least about 200 barrer, in some embodiments at least about 300 barrer, in some embodiments at least about 500 barrer, and in other embodiments greater than about 1000 barrers. The hollow nanostructures of the present invention are known by different names including nanostructures, nanoballoons, microcapsules, gas vesicles and microspheres. Any of these known nanostructures may be used, so long as they possess the characteristics described herein. Suitable nanostructures include synthetic hollow nanostructures and gas vesicles. Gas vesicles (or gas vesicle proteins) are naturally found in bacteria and have protein shells which enclose a gas filled space. Synthetic nanostructures comprise shells formed from polymers, metal oxides, metalloids, carbon and combinations thereof.

When the oxygen permeable particle is a hollow nanostructure, the hollow nanostructures have a particle size, in the longest dimension, of less than 500, in some embodiments less than about 400 nm and in other embodiments still, between about 10 and about 100 nm. In one embodiment the hollow nanostructure have an average diameter of about 20 to about 100 nm and a length of about 100 to about 500 nm. The nanostructures may have any closed, hollow structure, including cylindrical with closed ends, spherical, ovoid, regular and irregular polyhedra, ellipsoids, cones, spheroids (which can be described by the lengths of their 3 principal axes), and combinations thereof, or irregularly shaped. Naturally occurring nanostructures, such as gas vesicles, are frequently cylindrical with conical ends. Synthetic nanostructures may have any shape, and in one embodiment are selected from cylindrical and spherical structures.

The shell of the hollow nanostructures is permeable to gases, and particularly to oxygen, and to mixtures comprising oxygen, such as air. Gases such as oxygen and air freely move through the hollow nanostructures of the present invention. The nanostructure shells of the present invention have oxygen permeabilities of at least about 5 barrer, in some embodiments of at least about 20 barrer. In one embodiment, the oxygen permeability of the shell is equal to or greater than the oxygen permeability of the substrate polymer. However, because the shell thickness is relatively thin (less than about 10 nm, and in some embodiments between about 1 and about 5 nm) compared to the size of the nanostructure, relatively low oxygen permeabilities of the shell materials are still useful.

Because gases freely diffuse through the hollow nanostructures, and liquids (particularly water) do not, the shape of the nanostructures is maintained by the rigidity of the materials used to form the shell. The shell materials have a modulus of at least about 1 GPa, in some embodiments at least about 2 GPa, and in some embodiments between about 2.5 GPa and about 3.5 GPa. Shapes which are known to be stable under pressure include spheres and cylinders, cones and spheroids (which can be described by the lengths of their 3 principal axes), and combinations thereof. In one embodiment that hollow nanostructure is a sphere, and in another spheres having an average diameter of about 200 nm.

The structures may also include reinforcing structures such as ribs, reinforcing fillers, nanofibers, structural proteins, crosslinks (ionic or covalent) combinations thereof and the like.

The hollow nanostructures of the present invention retain their hollow structure and do not collapse during the production, sterilization and use of the articles in which they are incorporated. The maintenance or retention of the hollow nanostructure is characterized by a critical pressure of a least about 0.05 MPa and in some embodiments between about 0.1 MPa and about 0.3 MPa, and still other embodiments greater than 0.2 MPa.

Generally the outer portion of the nanostructure is hydrophilic and the inner structure is water impermeable. This allows the nanostructure to be readily dispersed in hydrophilic substrate polymers such as hydrogels, but prevents water from seeping into the gas filled cavity. The inner and outer structures of the nanostructure shell can be formed from separate layers, such as separate layers of polymers, proteins or other shell materials, or from a single amphiphilic material having its hydrophilic portion oriented outward, and the hydrophobic portion oriented toward the interior of the hollow nanostructure or towards an inner hydrophobic layer of the shell.

The hydrophilicity and water permeability of materials useful for forming the nanostructure may be characterized by the water permeability coefficient at 25° C. and the surface tension. Hydrophilic materials suitable for the outer structure of the shell have water permeability coefficients greater than about 100 and surface tensions greater than about 40 dyne/cm at 20° C. Water impermeable materials for the inner structure of the shell have water permeability coefficients at 25° C. of less than about 10, and surface tensions of less than about 35 dyne/cm at 20° C. In some embodiments the hydrophilic materials display contact angles of less than about 80°, and the water impermeable materials display contact angles of greater than about 100° when measured using the Wilhelmy plate method and distilled, deionized water at room temperature. Water permeability coefficients for a number of polymers are reported in Polymer Handbook, 4th Edition by J. Brandrup, Immergut, E. H., Grulke, E. A., Bloch, D.

In one embodiment the hollow nanostructures are formed synthetically. Examples of suitable synthetic methods include physicochemical processes where the shell material is precipitated during solvent evaporation or adsorption with controlled electrostatic or chemical interactions to form the shell. On example of this method is disclosed in Nature Vol 367 Jan. 20 1994. The hollow nanostructures may be formed by the phase separation via solvent evaporation of a polymer mixture of two or more polymers. The interfacial tensions and evaporation rates are selected such that a spherical droplet of one polymer becomes coated with a uniform layer of the other as a result of the spreading equilibria between two fluids suspended as emulsified droplets in a solvent.

When different materials are used for the inner and outer portions of the nanostructure shell, the material from which the outer hydrophilic layer is formed may be a polymer which can be crosslinked or polymerized with itself Examples of such materials include homo and copolymers of 2-hydroethyl methacrylate (HEMA), polyvinyl acetate, methacrylic acid, N-vinylpyrrolidone, N-vinyl acetamide, N-vinyl methyl acetamide, N,N dimethyl acrylamide, acrylic acid, glycerol monomethacrylate, MPC (2-Methacryloyloxyethyl phosphorylcholine), methyl methacrylate, hydroxyethyl acrylate, N-(1,1-dimethyl-3-oxybutyl)acrylamide, polyethylene glycol monomethacrylate, polyethylene glycol dimethacrylate, 2-ethoxyethyl methacrylate, 2-methacryloxyethyl phosphorylcholine, combinations thereof and the like. Other polymers having the water permeation coefficients and surface tensions described above may also be used. Examples include polysaccharides, hydrophilic polypeptides, polyesters, polyamides including nylons having repeating carbon sections of less than 4 carbon atoms, polyurethanes, proteoglycans, cellulose and hydrophobic backbone polymers which have hydrophilic side chains sufficient to provide the water permeation coefficients and surface tensions described above, and combinations thereof. Specific examples of polymers which may be used to form the outer shell include poly(acrylamide co-acrylic acid), poly(N-isopropylacrylamide), 2-hydroxymethacrylic ester containing polymers and copolymers, polyvinyl alcohol polymers and copolymers and the like. The polymers may have any structure, including linear, branched and brush structures. In one embodiment the outer shell is formed from a crosslinked polymer comprising at least one monomer used to form the substrate.

Examples of materials from which an inner layer may be formed include homopolymers and copolymers comprising polyorganosiloxanes (including silicone methacrylates), fluorine containing polymers, liposomes, hydrophobic polypeptides, polyesters, polyamides, polyurethanes, polystyrenes, polyanilines, polypyrroles, combinations thereof and the like. Examples of suitable inorganic materials include oxygen permeable perovskite oxides, metalloids such as boron nitrides, metal oxides, including iron oxide, aluminum oxide, titanium dioxide, zirconium oxide, metals, such as gold, transition metal sulfides, such as ZnS and CdS, graphene, inorganic/organic hybrids such as whole shell metal oxides coated with cellulose, polytetrafluoroethane, combinations thereof and the like. Specific examples of silicone containing polymers include polydimethylsiloxane (PDMS), cross-linked poly(dimethylsiloxane), poly(silsesquioxane), poly((trimethyl silyl)propyne). Examples of fluorine containing polymers include amorphous fluoropolymers such as 2,2-bis(trifluoromethyl)-4,5-difluoro-1,3-dioxole copolymers with tetrafluoroethylene (sold under the tradename TEFLON AF), fluorinated PDMS, and fluorinated polynorbornene. Copolymers containing the foregoing and mixtures of any of the foregoing with any of the inorganic materials may also be used.

The inner layer material may include latent reactive groups such as pentafluoromethacrylate and N-acryloxysuccinimide. Suitable latent reactive groups are disclosed in US2004/0120982 and may be added to the inner layer of the shell to allow reaction between the inner and outer layer materials. In another embodiment, the inner and outer shell materials have alternating charges, allowing the materials to associate via charge interaction. Examples of such materials include carboxylic acid metal salts, carboxylic acid/quaternary ammonium salts, sulfonic acid metal salts, sulfonic acids/quaternary ammonium salts.

Alternatively, the shell can be formed from one or more zwitterionic material, amphiphilic material, or combination thereof. Suitable zwitterionic and micellar materials are disclosed below. The amphiphilic materials are assembled such that the hydrophobic portion is oriented in toward the cavity of the nanostructure and the hydrophilic portion is oriented out toward the substrate. The amphiphilic material is then crosslinked to provide a nanostructure having the desired size, shape and modulus.

In another embodiment, the hollow nanostructures may be formed around a seed or template particle which is removed after at least part of the nanostructure is formed. In this embodiment, polymerization reactions, such as emulsion polymerization, microemulsion polymerization, suspension polymerization or liposome or micelle formation followed by crosslinking may be used to form the shell layer(s). Suitable template materials include polymeric microspheres, water—in-oil emulsion droplets, lyotropic phases exhibiting a mulitlamellar vesicular structure. The seed or template may be removed by calcination or solvent etching after the shell or at last one layer of the shell is formed. Examples of this synthetic method have been disclosed in "Graphene: A Perfect Nanoballoon", Leenaerts et al., Applied Physics Letters, 93, 193107 (2008). Dept Physics, Univ. Antwerpen; "Growing Nanoballoons and Nanotubes of Pure polymer from a Microcapsule", Fei et al., Inst. Textiles, Macromol. Rapid Commun 29 1882-1886, (2008). The Hong Kong Polytechnic University; "Silicone Nanocapsules Templated Inside the Membranes of Cationic Vesicles", Kepczynski et al., Langmuir, 23 7314-7320, (2007). Jagiellonian Univ. Krakow Poland; "Encapsulation of Inorganic Particles with Nanostructured Cellulose", Nelson and Deng, Macromol. Mater. Eng., 292 1158-1163, (2007). Georgia Tech.; "Stable Polymeric Nanoballoons: Lyphilization and Rehydration of Crosslinked Liposomes", Liu and O'Brian, J. Am. Chemical Society, 124 6037-6042, (2002), Chemistry Dept. Univ. Arizona; "Nanoparticles and nanoballoons of amorphous boron coated with crystalline boron nitride", Appl. Phys. Lett. 79, 188 (2001); "Carbon Nanoballoon Produced by Thermal Treatment of Arc Soot", New diamond and Frontier Carbon Technology, 15 No 2 (2005). Toyohashi University of Technology Japan; Fabrication of Core-Shell $Fe_3O_4$/polypyrole and Hollow Polypyrole Microspheres, Polymer Composites 2009. Lu et al., Jilin University, China. These disclosures are incorporated herein by reference.

Alternatively carbon hollow nanostructures may be formed via the thermal treatment of arc soot at more than 2400° C. Macromol. Mat. Eng. 2007 292, 1158-1163 "Encapsulation of Inorganic Particles with Nanostructured Cellulose".

In another embodiment, the nanostructures may be naturally occurring gas vesicles isolated from bacteria, such as from cyanobacteria (such as *Anabaena* and *Microcystis, Ocillatoria* and *Calothrix*), methogens and halophiles. Naturally occurring gas vesicles may be isolated by known methods such as those disclosed in WO 98/21311, which is incorporated in its entirety by reference. Isolated naturally occurring nanostructures may be used "as-isolated" or may be coated or encapsulated as disclosed herein.

Encapsulation

The oxygen permeable particles (both solid and hollow) may be encapsulated prior to incorporation into the reactive mixture used to make the polymer. This is particularly useful when either the core of a solid oxygen permeable particle or an inner layer of a hollow nanostructure is made from a water impermeable material or an amphiphilic material.

As used in the present invention "encapsulated" means surrounding the oxygen permeable particles with another material or entrapping the oxygen permeable particle within another material. Suitable means of encapsulating include coating the oxygen permeable particles, entrapping the oxygen permeable compounds within another material, to form for example a liposomal, micellar or polymeric structure around the oxygen permeable particles, combinations thereof and the like. The oxygen permeable particles may be encapsulated for a number of reasons. For example, oxygen permeable particles may be coated with a polymer to prevent them from causing an immunological response when incorporated into a medical device. In one embodiment the oxygen permeable particles may be encapsulated to change the properties of the particles, such as, for example, to make them more compatible with the components of the reactive mixture used to make the polymer. In another embodiment the particles may be encapsulated to help maintain a desired particle size, to prevent or limit aggregation or to provide the final article with other desired properties, such as but not limited to refractive index, biocompatibility (including immunological response, protein or lipid uptake), combinations thereof and the like. For example, the oxygen permeable particles may be encapsulated within a hydrophilic shell and dispersed within the reactive mixture. In addition to displaying improved compatibility with a hydrophilic reaction mixture, encapsulation also prevents the formation of hydrophobic sites within a lens formed from said reaction mixture. Hydrophobic sites may cause protein denaturation and lens fouling. Other reasons for encapsulation, and benefits therefrom will be apparent to those of skill in the art.

In one embodiment the oxygen permeable particles may be dispersed or suspended in the reactive mixture. The particles may be dispersed via ionic or steric forces, or a combination thereof. In one embodiment oxygen permeable particles form stable dispersions displaying particle sizes of less than about 1000 nm, which remain dispersed for at least about one hour, and in some embodiments at least about one day, and in some embodiments for a week or more. In one embodiment, the reaction mixture may further comprise at least one surface active agent may be added. Suitable surface active agents are compatible with the reactive mixture and suspended or dispersed particles, and do not cause haze. Suitable surface active agents include small molecule surfactants, polymeric surfactants, amphiphilic copolymers, combinations thereof and the like. Examples of suitable surface active agents include PEG-120 Methyl Glucose Dioleate (DOE 120, commercially from Lubrizol), PVP, polyvinyl alcohol/polyvinyl acetate copolymers, amphiphilic statitistical or block copolymers such as silicone/PVP block copolymers, polyalkylmethacrylate/hydrophilic block copolymers, organoalkoxysilanes such as 3-aminopropyltriethoxysilane (APS), methyl-triethoxysilane (MTS), phenyl-trimethoxysilane (PTS), vinyl-triethoxysilane (VTS), and 3-glycidoxypropyl-trimethoxysilane (GPS), silicone macromers having molecular weights greater than about 10,000 and comprising groups which increase viscosity, such as hydrogen bonding groups, such as but not limited to hydroxyl groups and urethane groups and mixtures thereof.

Where the dispersing agent is a polymer, it can have a range of molecular weights. Molecular weights from about 1000 up to several million may be used. The upper limit is bounded only by the solubility of the dispersing agent in the reactive mixture.

When a dispersing agent is used, the dispersing agent may be present in amounts between about 0.001% to about 40 weight %, based upon the weight % of all components in the reactive mixture. In some embodiments the dispersing agent may be present in amounts between about 0.01 weight % and about 30 weight % and in other embodiments between about 0.1 weight % and about 30 weight %. In some embodiments, the dispersing agent is also a reactive component used to form the polymeric article, such as where a contact lens comprising polyvinyl alcohol is produced. In these embodiments the amount of dispersing agent used may be up to about 90 weight % and in some embodiments up to about 100 weight % based upon the weight % of all components in the reactive mixture.

In one embodiment the oxygen permeable particles are coated with a coating composition. Suitable coating compositions may be selected to provide any of the features described above. For example, where compatibility with a conventional hydrogel reactive mixture is desired, suitable coating compositions include anionic, potentially anionic, cationic, potentially cationic, zwitterionic and polar neutral coating compositions, combinations thereof and the like. Examples of anionic and potentially anionic polymers which may be used as coating materials include, polyacrylic acid, hyaluronic acid, dextran sulfate, alginates, copolymers and mixtures thereof and the like.

Examples of cationic and potentially cationic polymers include poly(diallyldimethylammonium chloride)(PDAD-MAC), chitosan, poly(quats), poly(amines), poly(pyridines), copolymers and mixtures thereof and the like.

Examples of zwitterionic polymers include poly(sulfobetaines), poly(carboxybetaines), poly(phosphobetaines), copolymers thereof and the like. Specific examples of zwitterionic polymers include poly(3-[N-(2-acrylamidoethyl)dimethylammonio]propanesulfonate) poly(3-[N-(2-methylacrylamidoethyl)dimethylammonio]propanesulfonate), poly(3-[N-(2-methacryloxyethyl)dimethylammonio]propanesulfonate, poly(3-(N,N-dimethyl-N-(4-vinyl-phenyl)-ammonio)propanesulfonate, poly(3-[N-(2-acrylamidoethyl)dimethylammonio]propionate), poly(3-[N-(2-methylacrylamidoethyl)dimethylammonio]propionate), poly(3-[N-(2-methacryloxyethyl)dimethylammonio]propionte, poly(3-(N,N-dimethyl-N-(4-vinyl-phenyl)-ammonio)propionate, and poly(2-methacryloyloxyethyl phosphorylcholine. In some embodiments, anionic and zwitterionic or cationic and zwitterionic coating compositions comprise the outermost layer. The oxygen permeable particles may be coated with one or more layers.

Suitable methods for coating include 1) deposition of alternating layers of cationic/anionic polymers, polyacid/polybases, or polymeric hydrogen donor/acceptor species, 2) plasma treatment, 3) divergent and convergent graft (co)polymerization via conventional or controlled radical polymerization, 4) simple chemical modification of the surface with small molecules, such as grafting, or 5) surface degradation by chemical means, i.e. acid/base catalyzed hydrolysis, modification of the particle surface via ion, x-ray, gamma ray, or electron bombardment. Other modifications methods include oxidative plasma treatment and controlled gas plasma deposition.

In another embodiment the oxygen permeable particles are encapsulated within a micelle. This can be accomplished by a variety of routes, including but not limited to 1) direct micellization/solubilization of PDMS fluid to form an oil-in-water emulsion or micro-emulsion with a suitable surfactant system, 2) formation of an emulsion/micro-emulsion and subsequent curing of a reactive silicone, where the reactive silicone could consist of, but is not limited to a silanol functional polydialkyl siloxane oligomer, 3) formation of an emulsion or micro-emulsion and subsequent metal-catalyzed curing of reactive silicones, where the reactive silicone could consist of, but is not limited to a mixture of a vinyl- or allyl-functional polydialkyl siloxane oligomer and a hydride functional polydialkyl siloxane oligomer, and 4) preparation of siloxy-containing latexes via emulsion or micro-emulsion free radical polymerization using vinyl siloxy macromers such as, but not limited to polydialkyl siloxanes, such as mPDMS (monomethacryloxypropyl terminated mono-n-butyl terminated polydimethylsiloxane) or OHmPDMS (mono-(3-methacryloxy-2-hydroxypropyloxy)propyl terminated, mono-butyl terminated polydimethylsiloxane)), SiMAA DM (Methyl-bis(trimethylsilyloxy)-silyl-propylglycerol-dimethacrylate), or combinations thereof. The above-mentioned siloxy-emulsions/micro-emulsions may also be prepared directly in a reactive monomer mixture with appropriate monomer and diluent selection. Particles formed via the above-mentioned emulsion/micro-emulsion processes can be further stabilized by incorporation of a cross-linking agent during the curing process. Selection of cross-linking agents depends on the functionality of the reactive-silicone employed in particle formation. Examples of silicone cross-linking agents are well known to those skilled in the art and include, but are not limited to SiMAA DM (Methyl-bis(trimethylsilyloxy)-silyl-propylglycerol-dimethacrylate), tetra-alkoxy silanes and poly-functional vinyl, allyl, or silyl-hydride moieties with appropriate hydrosilylating metal catalysts.

Siloxy-emulsions/micro-emulsions may be formed from a variety of surfactant systems, including both ionic and non-ionic detergents. Surfactants that are commonly used in the preparation of latexes may be employed and are obvious to those skilled in the art. Examples of said surfactants include, but are not limited to alkyl sulfates, alkyl sulfonates, alkyl-benzene sulfonates, fatty acids, alkyl ethoxylates, alkyl quaternary ammonium salts, alkyl glucocides, polysorbates, and all combinations thereof.

Reactive surfactants may also be employed in the preparation of silicone microemulsion systems. Also known in the literature as "surfmers," these surface-active compounds contain a reactive group at the hydrophobic or hydrophilic terminus and are capable of taking part in the polymerization process, thereby incorporating themselves into final polymeric particle and eliminating or minimizing the need for surfactant removal. Examples of such materials that may be used to form silicone microemulsion particles include but are not limited to allyl polyalkylene glycol ethers, vinyl polyalkylene glycol ethers, allyl polyalkylene glycol ether sulfates, methacrylic acid esters of alkyl polyethylene glycol ethers, and vinyl polyethylene glycol ethers. These agents may be used as a substitute for or in combination with the above-mentioned standard emulsion polymerization surfactants.

In addition to lower molecular weight surfactants, polymeric surfactants and emulsifying agents may also be used in the preparation of siloxy-emulsions/micro-emulsions. Examples of such polymeric surfactants are well-known to those skilled in the art and include, but are not limited to pluronic/polaxamer surfactants, (co)polymers of N-vinyl pyrrolidone, copolymers of various hydrophobic monomers with vinyl alcohol, poly(ethylene-co-maleic anhydride) and combinations there of.

Embodiments involving the preparation of siloxy-latexes via free radical micro-emulsion polymerization, using vinyl siloxy macromers, such as, but not limited to SiMAA2 DM, OHmPDMS, and/or mPDMS, or combinations thereof, allow for the facile synthesis of high Dk particles with tunable compositions, and consequently, controlled structures and properties. Generally, this embodiment involves a micro-emulsion composed of one or a combination of the above-mentioned surfactants in water, at least one siloxy macromer, a cross-linking reactive monomer (such as SiMAA2 DM, EGDMA (ethylene glycol dimethacrylate) or DVB (divinylbenzene)), and a water-soluble free radical initiator. Depending on choice of initiator, the polymerization may be initiated via thermal, photochemical, or redox pathways. In a more preferred embodiment, the ratio of OHmPDMS to SiMAA2 DM may be varied to obtain final particles with tailored physical properties, including but not limited to desirable refractive index values and increased particle stability.

In the above embodiment, "water-soluble free radical initiator" is defined as any compound that, under specific conditions (i.e. temperature, light intensity and wavelength), generates one or multiple active radical species. These compounds are well known to those skilled in the art. Examples of water-soluble free radical initiators that may be employed within this embodiment include but are not limited to VA-044 (2,2'-Azobis[2-(2-imidazolin-2-yl)propane]dihydrochloride), V-50 (2,2'-Azobis(2-methylpropionamidine) dihydrochloride), VA-057 (2,2'-Azobis[N-(2-carboxyethyl)-2-methylpropionamidine]hydrate, VA-060 (2,2'-Azobis {2-[1-(2-hydroxyethyl)-2-imidazolin-2-yl] propane}dihydrochloride), VA-061 (2,2'-Azobis[2-(2-imidazolin-2-yl)propane]), VA-067 (2,2'-Azobis(1-imino-1-pyrrolidino-2-ethylpropane)dihydrochloride), VA-80 (2,2'-Azobis {2-methyl-N-[1,1-bis(hydroxymethyl)-2-hydroxyethyl]propionamide}), VA-086 (2,2'-Azobis[2-methyl-N-(2-hydroxyethyl)propionamide], VPE-0201 (poly (ethylene glycol) macro initiator MW=2000 g/mole), VPE-0401 (poly(ethylene glycol) macro initiator MW=4000 g/mole), VPE-0602 (poly(ethylene glycol) macro initiator MW=6000 g/mole), potassium persulfate, and any water-soluble photo-initiator. The invention is not restricted to the use of water-soluble free radical initiators. Micro-emulsion systems may be prepared with conventional oil soluble initiators.

In an additional preferred embodiment, the choice of water-soluble free radical initiator may dictate the final properties of the particles generated by emulsion/micro-emulsion polymerization. For example, if a hydroxyl- or PEG-functional initiator is employed in the polymerization, the surface properties of the final siloxy-latex may be modified, leading to controlled surface features, such as but not limited to, increased surface polarity, hydrophilicity, and consequently, biocompatibility.

Once formed, the oxygen permeable polymeric particles may covalently bond to, may associate with, or may be physically entrapped within their stabilizing surfactants. The particles may have a core/shell structure, containing the high Dk material in the core and the stabilizing surfactants and other stabilizing moieties in the shell. Once formed the micelle may covalently bond to the hydrogel polymer, may associate with the hydrogel polymer, or may be physically entrapped within the hydrogel polymer. The micelle may have a core/shell structure. Suitable compositions for forming micellar coatings may be selected to provide any of the features described above. For example, where compatibility with a conventional hydrogel reactive mixture is desired, suitable micelle compositions include that yield in the final particle, an anionic, cationic, zwitterionic, or polar-neutral micelle surface. Such moieties on the surface of micelle particles can be introduced by employing a silicone-reactive capping agent or surfactant during the emulsion/micro-emulsion process.

Any of the anionic, cationic or zwitterionic polymers disclosed above as coating compounds may be used in forming micellar coatings, so long as one end comprises the cationic, zwitterionic or anionic groups disclosed above, and the other end is compatible with said oxygen permeable particle. Examples of moieties which may be included at the hydrophobic terminus include alkoxy silanes, polychloro-silanes, vinyl silanes, polyfunctional allyl moieties, and polsilyl-hydrides, etc.), an aliphatic linker (typically propyl or butyl), and the like. Monomers and oligomers may also be used to form the micellar coatings of the present invention. Specific examples include alkyl benzene sulfonate and alkyl ethoxylate made by the methods described in IN 2003KO00640 by Wacker Metroark Chemicals Ltd. Other patents involving silicone ME polymerizations include U.S. Pat. No. 5,661, 215, and U.S. Pat. No. 6,316,541.

Suitable methods for forming a micellar coating include those that yield in the final particle, an anionic, cationic, zwitterionic, or polar-neutral surface. Such moieties on the surface of micelle particles can be introduced by employing a silicone-reactive capping agent or surfactant during the emulsion process. The capping agents are also surface-active and include a hydrophobic silicone-reactive moiety at one terminus (including, but not limited to alkoxy silanes, polychloro-silanes, vinyl silanes, polyfunctional allyl moieties, and polsilyl-hydrides, etc.), an aliphatic linker (typically propyl or butyl), and the desired polar or ionic group at the other terminus. The surface chemistry of the micelle particles can be easily manipulated by appropriate selection of capping agent in combinations thereof and the like.

Generally an emulsion is formed by mixing the selected surfactant in a suitable solvent above the critical micelle concentration, and preferably in concentrations greater than about 10 weight % and in some embodiments between about 15 and about 25 weight % surfactant, and in some embodiments between about 15 to about 20 weight %. Both emulsions and microemulsions can be used in the present invention, and wherever emulsions are disclosed, microemulsions may also be formed depending upon the particles and surfactants selected. The emulsion is heated and the oxygen permeable particles added. In some embodiments crosslinking agents may be added to form crosslinked micelles.

In another embodiment the oxygen permeable particles are encapsulated into liposomes. Suitable compositions may be selected to provide any of the features described above. For example, where compatibility with a conventional hydrogel reactive mixture is desired, phospholipids and other liposome-forming compounds may be employed. Suitable liposome forming compounds may include, but are not limited to DSPC (distearoylphosphatidylcholine), HSPC (hydrogenated soy phosphatidylcholine), and poly(ethylene glycol) conjugates with cholesterol, lipids, and phospholipids, combinations thereof, and the like.

Suitable methods for forming liposomes include known methods, such as but not limited to mixing the desired components, sonication, membrane extrusion and the like.

Examples of encapsulated solid oxygen permeable particles include cross-linked poly(dimethylsiloxane) core and a poly(silsesquioxane) shell prepared by Shin Etsu, Inc. (Japan) sold as X-52-7030, and having an average size distribution of 800 nm with a range from 0.2-2000 nm, dimethicone/vinyl dimethicone crosspolymer with silica treated coating, sold by Dow Corning as 9701 Cosmetic Powder.

The oxygen permeable particles may be incorporated into the hydrogel polymers of the present invention in an oxygen permeable enhancing effective amount. As used herein, an "oxygen permeable enhancing effective amount" is an amount effective to increase the oxygen permeability of the polymer by at least about 10%, at least about 25%, and in some embodiments at least about 50%, and in other embodiments, greater than 100%, compared to the oxygen permeability of the hydrogel polymer having no oxygen permeable particles. In some embodiments the compositions of the present invention comprise oxygen permeabilities of at least 25 barrer, at least about 40 barrers, in some embodiments at least about 60 barrers, and in other embodiments at least about 80 barrers and in other embodiments at least about 100 barrers.

The amount of oxygen permeable particles to be added to a reactive mixture can be readily determined by the desired oxygen permeability for the composition and the oxygen permeability for the polymer without any oxygen permeable particles. This may be readily done by making films of the polymers having different concentrations of the oxygen permeable particles, measuring the Dk of the films and interpolating to the desired oxygen permeability target to a concentration for the oxygen permeable particles of 100%. Additionally, for hollow nanostructures, the amount of nanostructures to be added to a reactive mixture can be readily determined by the target oxygen permeability of the system utilizing known permeability theory as described in Journal of Biotechnology 77 (2000) 151-156 "Evaluation of oxygen permeability of gas vesicles from cyanobacterium Anabaena flos-aquae".

The oxygen permeability of the encapsulated oxygen permeable particles will be dependent upon the properties of both the oxygen permeable particle and the encapsulating material, including, but not limited to particle size, surface area of the encapsulated particle, surface composition, thickness of the encapsulating material, degree of cross-linking in the core and shell.

For example, in one embodiment, where the hydrogel polymer is a copolymer hydroxyethyl methacrylate (HEMA) and about 2 weight % methacrylic acid (MAA), (which has an oxygen permeability of about 20 barrers), and the particles of PDMS (which has an oxygen permeability of about 600 barrers) are used as the oxygen permeable particle, the oxygen permeable particles may be added in amounts of at least about 15 weight %, and in some embodiments between about 20 and about 70 weight %.

The oxygen permeable particles may be added in amounts which are insufficient to undesirably impact other properties of the resulting composition. For example, where the composition will be used to make articles which must be clear to be useful, such as contact lenses, the polymer should be free from visible haze at the desired thickness of the article. In these embodiments, the polymer displays a % haze of less about 15%, in some embodiments less about 10%, and in others less than about 5% using the method described below. In another embodiment, the article is a contact lens, and the oxygen permeable particles are primarily incorporated outside the optic zone. This allows loadings of particles which have particles, particle concentrations or both which cause haze in the resulting lens.

It is a benefit of the present invention that the oxygen permeable particles may be added to the reactive mixtures used to make conventional hydrogels. Conventional hydrogels are well known and include homo and copolymers of polyHEMA and polyvinyl alcohol. Suitable comonomers include methacrylic acid, N-vinylpyrrolidone, N-vinyl acetamide, N-vinyl methyl acetamide, N,N dimethyl acrylamide, acrylic acid, glycerol monomethacrylate, MPC (2-Methacryloyloxyethyl phosphorylcholine)), methyl methacrylate, hydroxyethyl acrylate, N-(1,1-dimethyl-3-oxybutyl)acrylamide, polyethylene glycol monomethacrylate, polyethylene glycol dimethacrylate, 2-ethoxyethyl methacrylate, 2-methacryloxyethyl phosphorylcholine combinations thereof and the like. Homo and copolymers of polyHEMA include etafilcon, polymacon, vifilcon, bufilcon, crofilcon, genfilcon, hioxifilcon, lenefilcon, methafilcon, ocufilcon, perfilcon, surfilcon, tetrafilcon. Homo and copolymers of polyvinyl alcohol may also be used, including atlafilcon, and nelfilcon. Homo and copolymers of methyl methacrylate and hydrophilic monomers such as N,N-dimethyl methacrylamide or N-vinyl pyrrolidone, such as lidofilcon, may also be used. However, the oxygen permeable particles may be used to increase the oxygen permeability of any hydrogel formulation, including silicone hydrogels such as but not limited to balafilcon, lotrafilcon, aquafilcon, senofilcon, galyfilcon, narafilcon, comfilcon, oxyfilcon, siloxyfilcon and the like. When a USAN name is listed it includes all variations under the same name. For examples, lotrafilcon includes both lotrafilcon A and B.

The oxygen permeable particles of the present invention may be added directly to the reaction mixture used to form the hydrogel polymer or may be soaked or imbibed into the hydrogel polymer post cure.

The reactive components and oxygen permeable particles are mixed together to form the reactive mixture. The reactive mixture may optionally include diluents to help with processing or provide improved compatibility. Suitable diluents are known in art and may be selected based upon the polymer which is selected. For example, suitable diluents for conventional hydrogels include organic solvents, water or mixtures hereof In one embodiment when a conventional hydrogel is selected as the polymer, organic solvents such as alcohols, diols, triols, polyols and polyalkylene glycols may be used. Examples include but are not limited to glycerin, diols such as ethylene glycol or diethylene glycol; boris acid esters of polyols such as those described in U.S. Pat. Nos. 4,680,336; 4,889,664 and 5,039,459; polyvinylpyrrolidone; ethoxylated alkyl glucoside; ethoxylated bisphenol A; polyethylene glycol; mixtures of propoxylated and ethoxylated alkyl glucoside; single phase mixture of ethoxylated or propoxylated alkyl glucoside and $C_{2-12}$ dihydric alcohol; adducts of ε-caprolactone and $C_{2-6}$ alkanediols and triols; ethoxylated $C_{3-6}$ alkanetriol; and mixtures of these as described in U.S. Pat. Nos. 5,457,140; 5,490,059, 5,490,960; 5,498,379; 5,594,043; 5,684,058; 5,736,409; 5,910,519. Diluents can also be selected from the group having a combination of a defined viscosity and Hanson cohesion parameter as described in U.S. Pat. No. 4,680,336.

It may also be desirable to include one or more cross-linking agents, also referred to as cross-linking monomers, in the reaction mixture, such as ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other polyacrylate and polymethacrylate esters, such as the end-capped polyoxyethylene polyols described above containing two or more terminal methacrylate moieties. The cross-linking agents are used in the usual amounts, e.g., up to about 2 weight % of reactive components in the reaction mixture. Alternatively, if any of the monomer components act as a cross-linking agent, the addition of a separate crosslinking agent to the reaction mixture is optional. Examples of hydrophilic monomers that can act as the crosslinking agent and when present do not require the addition of an additional crosslinking agent to the reaction mixture include polyoxyethylene polyols containing two or more terminal methacrylate moieties.

The reactive mixture may contain additional components such as, but not limited to, UV absorbers, medicinal agents, antimicrobial compounds, reactive tints, pigments, copolymerizable and nonpolymerizable dyes, release agents and combinations thereof A polymerization initiator may also be included in the reaction mixture.

Polymerization initiators include compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, in one embodiment when a photoinitiator is used, preferred initiators induce bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and a preferred method of polymerization initiation is visible light. A preferred is bis(2,4,6-trimethylbenzoyl)-phenyl phosphine oxide (Irgacure 819®).

Articles, such as biomedical devices, and in some embodiments ophthalmic devices, may be prepared by mixing reactive components and the diluent(s), if used, with a polymerization initiator and curing by appropriate conditions to form a product that can be subsequently formed into the appropriate shape by lathing, cutting and the like. Alternatively, the reaction mixture may be placed in a mold having the shape of the desired article and subsequently cured into the desired article.

For example, where the reactive mixture is used to form a contact lens, any of the known processes for curing the reaction mixture in the production of contact lenses, including spincasting and static casting, may be used. Spincasting methods are disclosed in U.S. Pat. Nos. 3,408,429 and 3,660,545, and static casting methods are disclosed in U.S. Pat. Nos. 4,113,224 and 4,197,266. In one embodiment, the method for producing contact lenses comprising the polymer of this invention is by the direct molding of the reaction mixture, which is economical, and enables precise control over the final shape of the hydrated lens. For this method, the reaction mixture is placed in a mold having the shape of the final desired lens, and the reaction mixture is subjected to conditions whereby the reactive components polymerize, to thereby produce a polymer/diluent mixture in the shape of the final desired lens.

The compositions of the present invention have a balance of properties which makes them particularly useful. In one embodiment, where the compositions are used to make lenses, and particularly contact lenses, such properties include clarity, water content, oxygen permeability and contact angle. Thus, in one embodiment, the biomedical devices are contact lenses having a water content of greater than about 20%, and in some embodiments greater than about 30%.

As used herein clarity means substantially free from visible haze. Clear lenses have a haze value of less than about 150%, more preferably less than about 100% compared to a CSI lens.

The use of conventional hydrogels as the polymer provides additional benefits to resulting articles such as contact lenses, including contact angles below about 100°, and modulus below about 100 psi.

In some embodiments, contact lenses formed from the compositions of the present invention have average contact angles (advancing) which are less than about 80°, less than about 75° and in some embodiments less than about 70°. In some embodiments the articles of the present invention have combinations of the above described oxygen permeability, water content and contact angle. All combinations of the above ranges are deemed to be within the present invention.

Haze Measurement

As used herein clarity means substantially free from visible haze. Clarity may be measured via % haze which is calculated from transmittance. Transmittance may be measured via ASTM D1003 using an integrating sphere hazemeter. The test is conducted by taking four different consecutive readings and measuring the photocell output as follows $T_1$=specimen and light trap out of position, reflectance standard in position $T_2$=specimen and reflectance standard in position, light trap out of position $T_3$=light trap in position, specimen and reflectance standard out of position $T_4$=specimen and light trap in position, reflectance standard out of position The quantities represented in each reading are incident light, total light transmitted by specimen, light scattered by instrument, and light scattered by instrument and specimen, respectively.

Total transmittance $T_t$ and diffuse transmittance $T_d$ are calculated as follows $$T_t = T_2/T_1$$

$$T_d = [T_4 - T_3(T_2/T_1)]/T_1$$

The percentage of haze is calculated as follows $$\text{Haze percent} = T_d/T_t \times 100$$

Water Content

The water content of contact lenses was measured as follows: Three sets of three lenses are allowed to sit in packing solution for 24 hours. Each lens is blotted with damp wipes and weighed. The lenses are dried at 60° C. for four hours at a pressure of 0.4 inches Hg or less. The dried lenses are weighed. The water content is calculated as follows:

$$\% \text{ water content} = \frac{(\text{wet weight} - \text{dry weight})}{\text{wet weight}} \times 100$$

The average and standard deviation of the water content are calculated for the samples and are reported.

Modulus

Modulus is measured by using the crosshead of a constant rate of movement type tensile testing machine equipped with a load cell that is lowered to the initial gauge height. A suitable testing machine includes an Instron model 1122. A dog-bone shaped sample from −1.00 lenses having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Percent elongation is =[(Lf−Lo)/Lo]× 100. Tensile modulus is measured at the initial linear portion of the stress/strain curve.

Advancing Contact Angle

The advancing contact angle was measured using −1.00 power lenses as follows. Four samples from each set were prepared by cutting out a center strip from the lens approximately 5 mm in width and equilibrated in packing solution. The wetting force between the lens surface and borate buffered saline is measured at 23° C. using a Wilhelmy microbalance while the sample is being immersed into or pulled out of the saline. The following equation is used $$F = 2\gamma p \cos \theta \text{ or } \theta = \cos^{-1}(F/2\gamma p)$$

where F is the wetting force, γ is the surface tension of the probe liquid, p is the perimeter of the sample at the meniscus and θ is the contact angle. The advancing contact angle is obtained from the portion of the wetting experiment where the sample is being immersed into the packing solution. Each sample was cycled four times and the results were averaged to obtain the advancing contact angles for the lens.

Oxygen Permeability (Dk)

The Dk is measured as follows. Lenses are positioned on a polarographic oxygen sensor consisting of a 4 mm diameter gold cathode and a silver ring anode then covered on the upper side with a mesh support. The lens is exposed to an atmosphere of humidified 2.1% $O_2$. The oxygen that diffuses through the lens is measured by the sensor. Lenses are either stacked on top of each other to increase the thickness or a thicker lens is used. The L/Dk of 4 samples with significantly different thickness values are measured and plotted against the thickness. The inverse of the regressed slope is the Dk of the sample. The reference values are those measured on commercially available contact lenses using this method. Balafilcon A lenses (−1.00) available from Bausch & Lomb give a measurement of approx. 79 barrer. Etafilcon lenses give a measurement of 20 to 25 barrer. (1 barrer=$10^{-10}$ ($cm^3$ of gas×$cm^2$)/($cm^3$ of polymer×sec×cm Hg)).

Si Content via Neutron Activation

Si content was measured via neutron activation. All samples, standards, and quality controls are irradiated for 15 seconds, allowed to decay for 120 seconds and counted for 300 seconds. The concentration of silicon is determined by measuring the 1779 keV gamma-ray from the decay of 28A1 (t1/2=2.24 minutes). The 28A1 is produced via the (n,p) reaction on 28Si. Three geometrically equivalent silicon standards are analyzed with the sample set. The standards are prepared by spiking paper pulp with silicon from a 10.00±0.05 mg/mL certified solution standard (High Purity Standards). The results are blank corrected for the 28A1 signal from the blank high-density polyethylene sample irradiation vial. NIST SRM 1066a Octaphenylcyclotetrasiloxane is co-analyzed with the samples as a quality control check for the analysis. The certified silicon concentration in this SRM is 14.14±0.07 Wt. % Si. The average value for the analysis of three 10 mg aliquots of the SRM was 14.63±0.70 Wt. % Si.

Surface Roughness

Surface roughness was measured via AFM using a Digital Instruments Nanoscope, a scan size of 20 μm and a scan rate of 7.181 Hz. For each sample 256 scans were processed and the data scale employed was 1000 μm. The engage X and Y positions were −19783.4 and −42151.3 μm, respectively.

Scanning Electron Microscopy of Lenses

SEM Surface Characterization: Surface images were captured from all samples on both the concave and convex surfaces at three locations (left, middle and right). The imaging was performed using an FEI Quanta Environmental SEM using an accelerating voltage of 25 kV and 5 nA of beam current at 5000× magnification for all locations in SE and BSE imaging modes.

SEM Profile Characterization: Profile (cross-section) images were captured using the same beam conditions as the surface images. Since the entire cross section of the lens could not be imaged at 5 k× magnification creating mosaics of the images was necessary to view the entire cross-section of each lens. Images were captured in serial at 5 k× magnification starting near the concave side of the lens (top), then stepped frame by frame through the lens until the convex edge of the lens was eventually imaged. The individual images were then merged together using Photoshop.

The Examples below further describe this invention, but do not limit the invention. They are meant only to suggest a method of practicing the invention. Those knowledgeable in the field of contact lenses as well as other specialties may find other methods of practicing the invention. However, those methods are deemed to be within the scope of this invention.

Some of the materials employed in the Examples are identified as follows:

BAGE: Boric acid glycerol ester
DBS: N-Dodecylbenzenesulfonic acid, from Sigma Aldrich
HEMA: 2-hydroxyethyl methacrylate (99% purity)
MAA: methacrylic acid (99% purity)
OHmPDMS: mono-(3-methacryloxy-2-hydroxypropyloxy) propyl terminated, mono-butyl terminated polydimethylsiloxane), (612 molecular weight), DSM Polymer Technology Group
SiMAA DM: Methyl-bis(trimethylsilyloxy)-silyl-propylglycerol-dimethacrylate, DSM Polymer Technology Group, made according to Example Preparation in US US2005/0255231
Si microparticle: a cross-linked poly(dimethylsiloxane) core and a poly(silsesquioxane) shell (Shin Etsu, Inc. (Japan), X-52-7030, with an average size distribution of 800 nm with a range from 0.2-2000 nm, as determined by the manufacturer via SEM).

EXAMPLES 1-11

Monomer mix comprising 94.90% HEMA, 1.94% MAA, 0.95% Norbloc, 1.33% Irgacure 1700, 0.77% EGDMA, 0.09% TMPTMA, and 0.02% Blue HEMA (w/w) in BAGE diluent (52:48 monomer:diluent) herein referred to as reactive monomer mix (RMM) was prepared and used for Examples 1-11.

In the preparation of examples 1-10 the desired mass of Si microparticles was added to an amber scintillation vial followed by addition of etafilcon RMM (10 g). The scintillation vial was capped and rolled for 2 hours prior to being degassed in vacuo (10 minutes) and used to prepare lenses. Levels of microparticles and RMM employed for each formulation are listed in Table 1, below. Lenses were then prepared for each example by dosing each Si microparticl monomer mix into separate front curves via pipette.

Example 11 in Table 1 was prepared by suspending half of the mass of the microparticles required in 2.4 g ethylene glycol and the other half in 5.2 g of monomer mix without BAGE. The mixture was then further diluted with BAGE and homogenized via high-shear mechanical mixing. The resulting monomer mix was degassed for 10 minutes in vacuo. The high viscosity of Example 11 required that it be dosed into the front-curves via a pressurized syringe.

All lenses were prepared at −1.0 power using Zeonor (Zeon Chemical) front/back curves. Curing was carried-out in an $N_2$-purged glove box at 50° C. for 10 minutes under a TL03 lamp (400 nm) at an intensity of 3.4 mW/cm$^2$. Lenses were demolded and released in a deionized water-bath at 90° C. prior to being stored in Borate Buffered Saline Solution in individual crimp-sealed, glass vials. All lenses were sterilized at 121° C. for 30 minutes in an autoclave prior to analysis.

TABLE 1

| Ex # | Si MP mass (g) | Diluent mass (g) | Reactive monomer (g) | % Si MP$_{theo}$ in Lens | % Si$_{Theo}$ in Lens |
|---|---|---|---|---|---|
| 1 | 0.000 | 4.8 | 5.2 | 0.0 | 0.0 |
| 2 | 0.125 | 4.8 | 5.2 | 2.4 | 0.9 |
| 3 | 0.250 | 4.8 | 5.2 | 4.6 | 1.7 |
| 4 | 0.500 | 4.8 | 5.2 | 8.8 | 3.3 |
| 5 | 0.750 | 4.8 | 5.2 | 12.6 | 4.8 |
| 6 | 1.000 | 4.8 | 5.2 | 16.1 | 6.1 |
| 7 | 1.250 | 4.8 | 5.2 | 19.4 | 7.4 |
| 8 | 1.500 | 4.8 | 5.2 | 22.4 | 8.5 |
| 9 | 1.750 | 4.8 | 5.2 | 25.2 | 9.6 |
| 10 | 2.800 | 4.8 | 5.2 | 35.0 | 13.3 |
| 11 | 15.600 | 0.0 | 5.2 | 75.0 | 28.5 |

The Dk, water-content, and Si content were measured for each set of lenses.

The results for each mixture are listed in Table 2 below. It is readily apparent from the data that as the level of silicone microparticles is increased from 0% to 64.3%, the resulting lens Dk increases from 20 to 76 units. FIG. 1 is a graph of Dk versus silicone microparticle concentration in the final lens. FIG. 1, shows a positive, non-linear polynomial trend.

Figure 2:
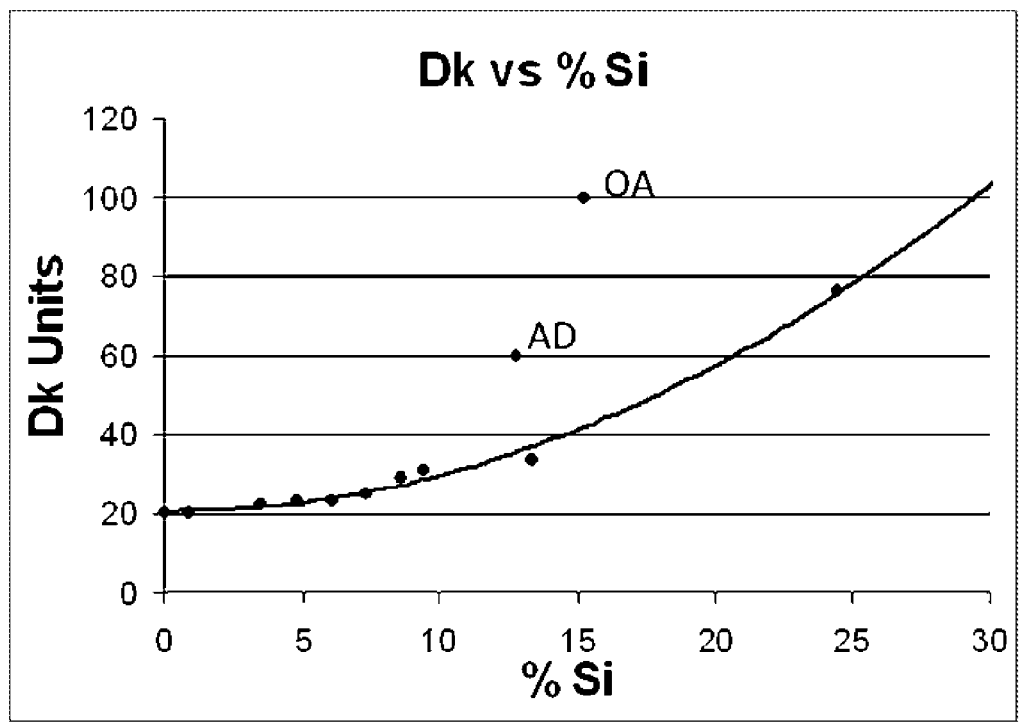
FIG. 2 is a graph of Dk vs. silicon content.

When Dk is plotted against the level of elemental Si in the lens (as in FIG. 2), a similar non-linear polynomial is obtained. For comparative purposes two separate data points have been inserted into FIG. 2 to represent current SiH benchmarks, Oasys (% Si=15.0, Dk=104) and Advance (% Si=13.0, Dk=60). By comparing these benchmarks to the data obtained in Examples 1-11, the addition of silicone microparticles does increase the Dk of the resulting polymers.

TABLE 2

| Ex # | % Si NP in Lens | % Si$_{Theo}$ of Lens | % Si$_{Obs}$ of Lens | % Water Content | Dk Units |
|---|---|---|---|---|---|
| 1 | 0.0 | 0.0 | 0 | 60.5 | 20 |
| 2 | 2.35 | 0.9 | 1 | 60.0 | 20 |
| 3 | 4.59 | 1.7 | 2 | 58.7 | ND |
| 4 | 8.77 | 3.3 | 3 | 58.5 | 22 |
| 5 | 12.61 | 4.8 | 5 | 58.2 | 23 |
| 6 | 16.13 | 6.1 | 6 | 57.6 | 23 |
| 7 | 19.38 | 7.4 | 7 | 57.5 | 25 |
| 8 | 22.39 | 8.5 | 9 | 58.5 | 29 |
| 9 | 25.18 | 9.6 | 9 | 56.9 | 31 |
| 10 | 35.00 | 13.3 | 13 | 57.3 | 34 |
| 11 | 64.3 | 28.5 | 24 | 55.7 | 76 |

Figure 3:
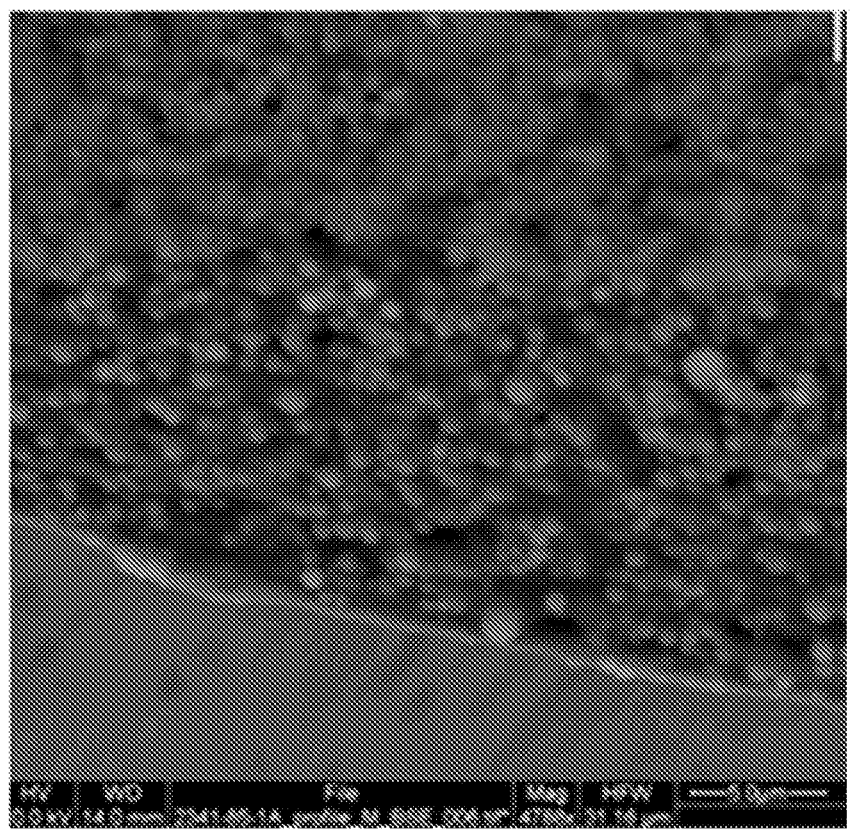
FIG. 3 is an SEM micrograph of an etafilcon-based lens containing 800 nm Shin Etsu POSS/PDMS micro-particles
Figure 4:
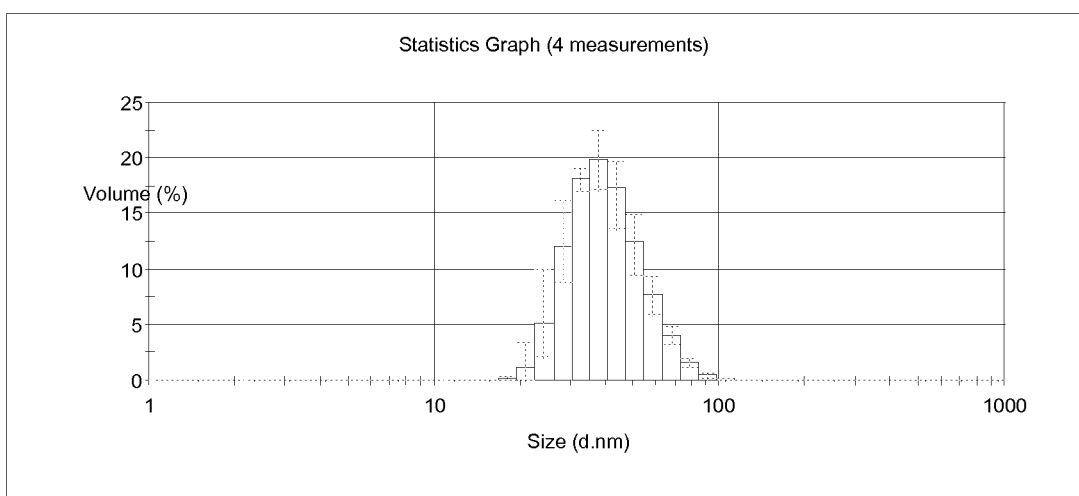
FIG. 4 is the Volume Distribution Histogram of Particle Sizes for SiME-OHmPDMS 20
Figure 5:
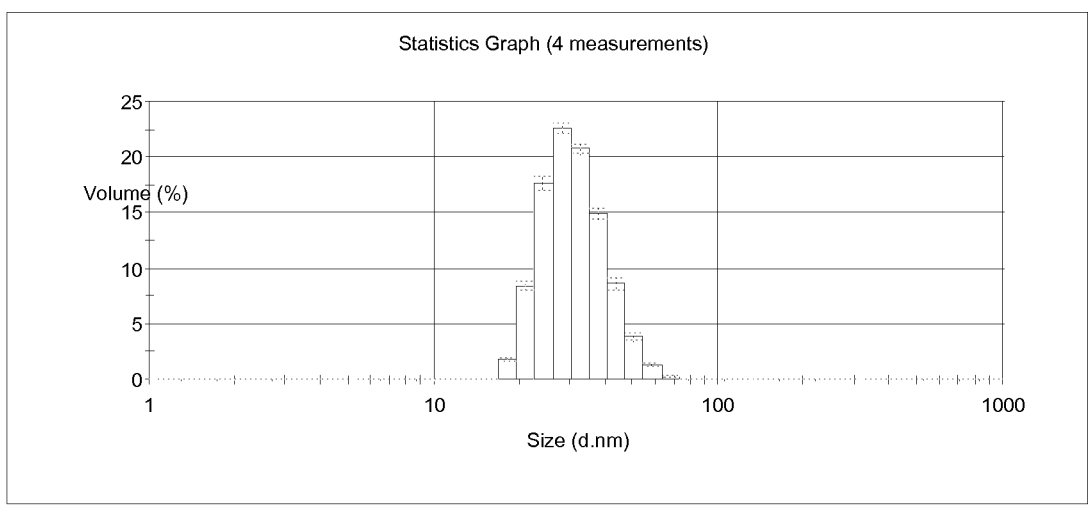
FIG. 5 is the Volume Distribution Histogram of Particle Sizes for SiME-OHmPDMS 40
Figure 6:
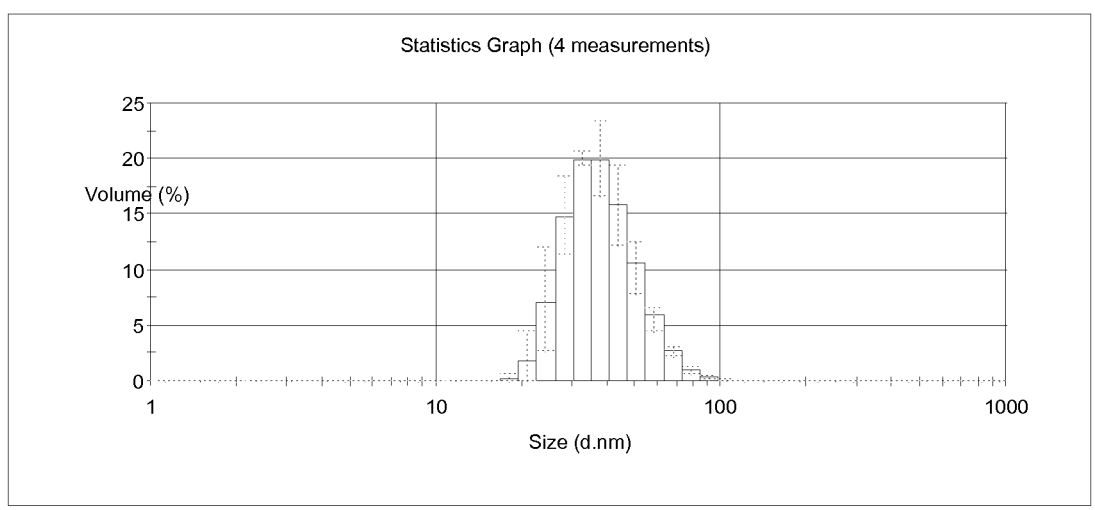
FIG. 6 is the Volume Distribution Histogram of Particle Sizes for SiME-OHmPDMS 60
Figure 7:
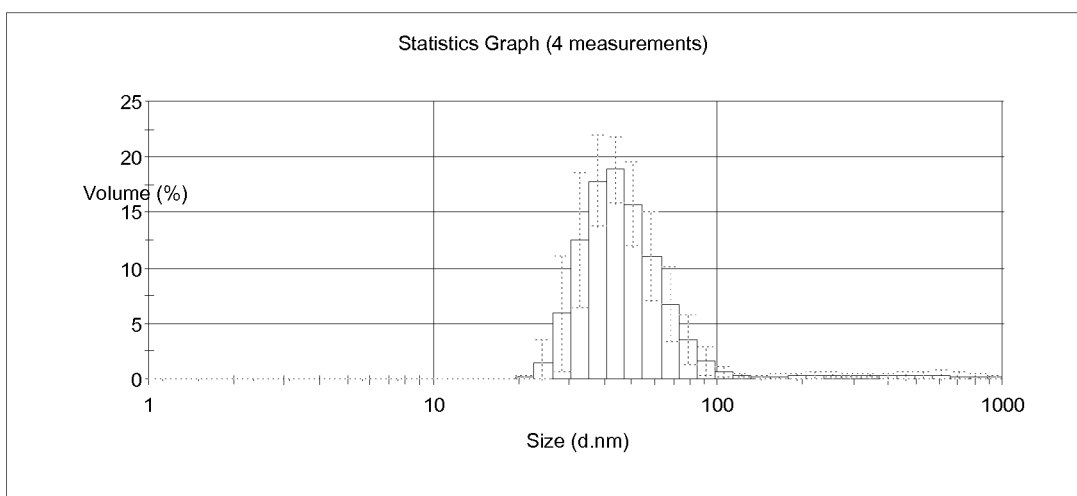
FIG. 7 is the Volume Distribution Histogram of Particle Sizes for SiME-OHmPDMS 80

An SEM micrograph of the lens of Example 10 is shown at FIG. 3. All locations imaged by SEM had very rough surfaces containing many clusters of particles. Generally the topography and particle clustering was homogenous throughout the sample (on both sides of the lenses). Individual particle sizes were not able to be measured due to the clustering of the particles. Through observation of SEM images the particles were estimated to be between about 600 and about 1000 nm in size.

The SEM cross-sections of the lenses looked nearly homogenous to that of the surface images, consisting of clustered particles resulting in a rough topography.

EXAMPLES 12-15

Preparation of Siloxane Nano-Particles via Free Radical Micro-Emulsion Polymerization of OHmPDMS and SiMAA DM Water-soluble initiator, VA-044, was purchased from Wako Specialty Chemical Company and was also used as received.

Each of the particle dispersions, having the compositions listed in Table 3, were made as follows. Water and DBS were added to a 1 L, 3-necked, jacketed reaction flask, equipped with a mechanical stirrer and thermal probe. The water and DBS were heated to 44° C. and stirred under a nitrogen blanket until a transparent microemulsion was formed. After 30 minutes of stirring at 300 rpm under nitrogen, an aqueous VA-044 solution (200 mg in 1 mL DI water) was added by syringe and allowed to mix. Both OHmPDMS and SiMAA DM were blended together and the resulting mixture was added drop-wise to the microemulsion while stirring at 300 rpm. After all of the silicone mixture was added (about 3-4 hours), the addition funnel was removed and the flask was sealed with a vented rubber septum. The reaction was kept under a nitrogen atmosphere at 44° C. overnight. The following morning, an additional 200 mg VA-044 in 1 mL DI water was added to the microemulsion. The microemulsion was then allowed to react for an additional four hours.

Each dispersion listed in Table 3 was characterized via dynamic light scattering (DLS) with a Malvern-ZetaSizer Nano-S detector. After each reaction was complete, an aliquot was removed and diluted 10-fold. The diluted dispersion was then analyzed by DLS to obtain the z-average particle size distribution. Measurements were also taken after dialysis of each dispersion. Data files from the DLS were processes using CUMULANTS analysis function included in the detector software. All data files generated good fits within the CUMULANTS curve. The hydrodynamic diameters of each resulting Silicone ME are listed in Table 4 below with their corresponding PDI widths and % PDI values.

TABLE 3

| Ex. # | OHmPDMS (g) | SiMAA DM (g) | H₂O (g) | DBS (g) | VA-044 (mg) |
|---|---|---|---|---|---|
| 12 | 24 | 96 | 350 | 80 | 400 |
| 13 | 48 | 72 | 350 | 80 | 400 |
| 14 | 72 | 48 | 350 | 80 | 400 |
| 15 | 96 | 24 | 350 | 80 | 400 |

TABLE 4

| Ex. # | Z-Avg. $D_H$ (nm) | PDI Width (nm) | % PDI |
|---|---|---|---|
| 12 | 46.7 (0.2) | 16.2 | 34.7 |
| 13 | 34.8 (0.2) | 10.3 | 29.6 |
| 14 | 44.2 (0.2) | 15.7 | 35.5 |
| 15 | 65.1 (0.2) | 35.5 | 54.6 |

The dispersions are stable in water for at least 2 months. Any settling is readily redispersed with mild agitation.

Dispersions having 50:50 HO-mPDMS and SiMAA DM in water were made as above. This dispersion was dialyzed against DI water using a 3500 MWCO regenerated cellulose dialysis membrane from Spectrapore. The resulting dispersion was stable for over 2 months.

Frequency histograms of the Examples 12-15 are attached. The data files generated from DLS of Examples 12-15 correlated well using CUMULANTS fit, indicating Gaussian distribution of particle size and evidencing low or no aggregation in the dispersions. This is shown graphically by the histograms shown in FIGS. 4-7.

What is claimed is:

1. An ophthalmic device formed from a composition comprising a hydrogel polymer having distributed therein an oxygen enhancing effective amount of oxygen permeable particles comprising oxygen permeable perovskite oxides, said oxygen permeable particles having an oxygen permeability of at least about 100 barrer and average particle size less than about 5000 nm.

2. The ophthalmic device of claim 1 wherein said composition has an oxygen permeability of at least about 40 barrer.

3. The ophthalmic device of claim 1 wherein said composition has an oxygen permeability of at least about 60 barrer.

4. The ophthalmic device of claim 1 wherein said composition has an oxygen permeability of at least about 100 barrer.

5. The ophthalmic device of claim 1, wherein the oxygen permeable particles are non-reactive.

6. The ophthalmic device of claim 1 wherein said oxygen permeable particles have an oxygen permeability of about 100 barrer to about 6000 barrer.

7. The ophthalmic device of claim 1 wherein said oxygen permeable particles have an oxygen permeability of about 300 barrer to about 1000 barrer.

8. The ophthalmic device of claim 1 wherein said oxygen permeable particles have an average particle size of less than about 800 nm.

9. The ophthalmic device of claim 8 wherein said hydrogel polymer is selected from the group consisting of homopolymers and compolymers comprising polyHEMA, PVOH.

10. The ophthalmic device of claim 1 wherein said oxygen permeable particles have an average particle size of less than about 600 nm.

11. The ophthalmic device of claim 1 wherein said oxygen permeable particles have an average particle size of less than about 200 nm.

12. The ophthalmic device of claim 1, wherein the oxygen permeable particles are encapsulated.

13. The ophthalmic device of claim 12, wherein the oxygen permeable materials are encapsulated with materials selected from a coating, micelle, liposome, combinations thereof and the like.

14. The ophthalmic device of claim 13 wherein said oxygen permeable material is encapsulated with a coating composition comprising hydroxyl groups.

15. The ophthalmic device of claim 14 wherein said hydrogel polymer further comprises comonomers selected from the group consisting of acrylic acid, methacrylic acid, vinyl pyrrolidone, N-vinyl methyl acetamide, N,N dimethyl acrylamide, acrylic acid, glycerol monomethacrylate, MPC (Ishihara monomer), methyl methacrylate, hydroxyethyl acrylate, N -(1,1-dimethyl-3-oxybutyl) acrylamide, polyethylene glycol monomethacrylate, polyethylene glycol dimethacrylate, 2-ethoxyethyl methacrylate, 2-methacryloxyethyl phosphorylcholine and mixtures thereof.

16. The ophthalmic device of claim 13 wherein said oxygen permeable material is encapsulated with a coating composition selected from crosslinked or uncrosslinked core/shell type micelles.

17. The ophthalmic device of claim 13 wherein said encapsulating material is compatible with said hydrogel polymer.

18. The ophthalmic device of claim 13 wherein said encapsulating material is biocompatible.

19. The ophthalmic device of claim 12 wherein said encapsulating material is selected from the group consisting of a liposomal, micellar or polymeric structures.

20. The ophthalmic device of claim 19 wherein said encapsulating material comprises a polymer structure selected from the group consisting of anionic, cationic, zwitterionic, polar neutral compositions and mixtures thereof.

21. The ophthalmic device of claim 1 wherein said wherein said oxygen permeable particles have an average particle size of less than about 100 nm.

22. The ophthalmic device of claim 1 wherein said hydrogel polymer has less than 100% haze and comprises a refractive index from 1.37 to about 1.45, and said oxygen permeable material has a refractive index within 10% of the hydrogel polymer refractive index.

23. The ophthalmic device of claim 1 wherein said hydrogel polymer has less than 100% haze and said oxygen permeable material has a refractive index between about 1.37 and about 1.45.

24. The ophthalmic device of claim 1 where said oxygen permeable particle has an average particle size of less than about 1000 nm.

25. The ophthalmic device of claim 1 wherein said oxygen permeable particles have an average particle size of less than about 100 nm.

26. The ophthalmic device of claim 1 further comprising a % haze of less than about 15%.

27. The ophthalmic device of claim 1 where said oxygen permeable particles are spherical.

28. An ophthalmic device formed from a composition comprising a hydrogel polymer having distributed therein oxygen permeable particles comprising oxygen permeable perovskite oxides, said oxygen permeable particles with an average particle size less than about 5000 nm and in an amount sufficient to increase the oxygen permeability of the hydrogel polymer by at least about 10 barrers.

29. A contact lens formed from a composition comprising a hydrogel polymer having distributed therein an oxygen enhancing effective amount of oxygen permeable particles comprising oxygen permeable perovskite oxides, said oxygen permeable particles having an oxygen permeability of at least about 100 barrer and average particle size less than about 5000 nm.

30. A contact lens comprising a hydrogel polymer having distributed in a region outside the optic zone of said contact lens an oxygen enhancing effective amount of oxygen permeable particles comprising oxygen permeable perovskite oxides, said oxygen permeable particles having an oxygen permeability of at least about 100 barrer and average particle size of between about 200 nm and 100 microns.

* * * * *

UNITED STATES PATENT AND TRADEMARK OFFICE
CERTIFICATE OF CORRECTION

PATENT NO. : 8,513,324 B2
APPLICATION NO. : 13/737364
DATED : August 20, 2013
INVENTOR(S) : Scales et al.

It is certified that error appears in the above-identified patent and that said Letters Patent is hereby corrected as shown below:

In the Claims:

Column 22, Line 35, Claim 21:
"The ophthalmic device of claim 1 wherein said wherein said oxygen" should read:
--The ophthalmic device of claim 1 wherein said oxygen--

Signed and Sealed this
Eighth Day of October, 2013

Teresa Stanek Rea
*Deputy Director of the United States Patent and Trademark Office*